US010982037B2

(12) United States Patent
Kajita et al.

(10) Patent No.: US 10,982,037 B2
(45) Date of Patent: Apr. 20, 2021

(54) POLYURETHANE COMPOSITION

(71) Applicant: SEKISUI CHEMICAL CO., LTD., Osaka (JP)

(72) Inventors: Tomonori Kajita, Saitama (JP); Yozo Toei, Tokyo (JP); Kazuhiro Okada, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 219 days.

(21) Appl. No.: 16/304,201

(22) PCT Filed: May 26, 2017

(86) PCT No.: PCT/JP2017/019783
§ 371 (c)(1),
(2) Date: Nov. 23, 2018

(87) PCT Pub. No.: WO2017/204345
PCT Pub. Date: Nov. 30, 2017

(65) Prior Publication Data
US 2020/0317852 A1    Oct. 8, 2020

(30) Foreign Application Priority Data
May 26, 2016    (JP) .............................. JP2016-105133

(51) Int. Cl.
| C08G 18/42 | (2006.01) |
| C08G 18/16 | (2006.01) |
| C08G 18/18 | (2006.01) |
| C08G 18/20 | (2006.01) |
| C08G 18/22 | (2006.01) |
| C08G 18/76 | (2006.01) |
| C08K 3/02 | (2006.01) |
| C08K 3/24 | (2006.01) |
| C08K 3/38 | (2006.01) |
| C08K 5/17 | (2006.01) |
| C08K 5/521 | (2006.01) |
| C08G 101/00 | (2006.01) |

(52) U.S. Cl.
CPC ....... *C08G 18/4213* (2013.01); *C08G 18/163* (2013.01); *C08G 18/1808* (2013.01); *C08G 18/2027* (2013.01); *C08G 18/222* (2013.01); *C08G 18/7671* (2013.01); *C08K 3/02* (2013.01); *C08K 3/24* (2013.01); *C08K 3/38* (2013.01); *C08K 5/17* (2013.01); *C08K 5/521* (2013.01); *C08G 2101/00* (2013.01); *C08K 2003/026* (2013.01); *C08K 2003/387* (2013.01); *C08K 2201/014* (2013.01)

(58) Field of Classification Search
CPC ............ C08G 18/4213; C08G 18/1808; C08G 18/2027; C08G 18/222; C08G 18/7671; C08G 18/163; C08G 2101/00; C08K 3/02; C08K 3/38; C08K 3/24; C08K 5/17; C08K 5/521; C08K 2203/387; C08K 2003/026; C08K 2201/014
USPC ........................................................ 524/145
See application file for complete search history.

(56) References Cited

U.S. PATENT DOCUMENTS

| 5,278,120 | A | * | 1/1994 | Eling | ................. | C08G 18/1875 |
| | | | | | | 502/164 |
| 5,342,856 | A | * | 8/1994 | Weber | ...................... | C08K 5/17 |
| | | | | | | 521/51 |
| 6,057,416 | A | * | 5/2000 | Nodelman | ........... | C08G 18/163 |
| | | | | | | 528/53 |
| 2012/0130002 | A1 | | 5/2012 | Scholl et al. | | |
| 2014/0113984 | A1 | * | 4/2014 | Burdeniuc | ......... | C08G 18/1833 |
| | | | | | | 521/131 |
| 2014/0162074 | A1 | | 6/2014 | Westhoff et al. | | |
| 2016/0251491 | A1 | | 9/2016 | Okada et al. | | |

FOREIGN PATENT DOCUMENTS

| EP | 3 357 947 | 8/2018 |
| JP | 57-87412 | 5/1982 |
| JP | 5-209037 | 8/1993 |
| JP | 6-256450 | 9/1994 |
| JP | 8-508760 | 9/1996 |
| JP | 2012-111935 | 6/2012 |
| JP | 2013-144397 | 7/2013 |
| JP | 2014-510174 | 4/2014 |
| JP | 2014-517118 | 7/2014 |
| JP | 2015-508105 | 3/2015 |
| JP | 2015-533912 | 11/2015 |
| WO | 94/24182 | 10/1994 |
| WO | 2012/170912 | 12/2012 |
| WO | 2013/110712 | 8/2013 |
| WO | 2014/066596 | 5/2014 |
| WO | 2015/129850 | 9/2015 |

OTHER PUBLICATIONS

Notice of Reasons for Refusal dated Dec. 18, 2019 in corresponding Japanese Patent Application No. 2017-529411, with English Translation.
Extended European Search Report dated Dec. 13, 2019 in corresponding European Patent Application No. 17802931.0.
International Search Report dated Aug. 8, 2017 in International (PCT) Application No. PCT/JP2017/019783.

* cited by examiner

*Primary Examiner* — Michael Bernshteyn
(74) *Attorney, Agent, or Firm* — Wenderoth, Lind & Ponack, L.L.P.

(57) ABSTRACT

Provided is a polyol composition for obtaining a polyurethane foam by reacting the composition with a polyisocyanate compound. The polyol composition contains a polyol, a transition metal compound, and a tertiary amine.

11 Claims, No Drawings

POLYURETHANE COMPOSITION

TECHNICAL FIELD

The present invention relates to a polyol composition, a polyurethane premix composition, a polyurethane composition, and a polyurethane resin.

BACKGROUND ART

Foamed polyurethane resins are used in heat-insulating materials of buildings, including housing complexes such as condominium apartments, single-family housing, school facilities, and commercial buildings. Because urethane resins have low flame retardancy, increasing the isocyanurate ratio in a urethane resin is known to be effective for improving the flame retardancy of the resin.

CITATION LIST

Patent Literature

PTL 1: JP2015-508105A
PTL 2: JP2014-510174A
PTL 3: JP2014-517118A
PTL 4: JP2012-111935A

SUMMARY OF INVENTION

Technical Problem

However, the formation of isocyanurates requires a certain temperature, and a target isocyanurate formation rate has been difficult to achieve. Low isocyanurate formation rates reduce fire resistance.

An object of the present invention is to provide a polyurethane composition having an excellent isocyanurate formation capacity, and a polyurethane resin.

Solution to Problem

The present inventors conducted extensive research to achieve the object, and found that a combination of a transition metal compound with a tertiary amine compound highly actively forms isocyanurates. The present inventors thereby completed the present invention.

Specifically, the present invention is as follows.

[1] A polyol composition for obtaining a polyurethane resin by reacting the composition with a polyisocyanate compound, the polyol composition comprising
  a polyol,
  a transition metal compound, and
  a tertiary amine.
[2] The polyol composition according to [1], wherein the transition metal compound comprises at least one transition metal selected from the group consisting of zinc, copper, iron, tin, lead, and bismuth.
[3] The polyol composition according to [2], wherein the transition metal compound comprises zinc.
[4] The polyol composition according to [3], wherein the weight ratio of the zinc compound to the tertiary amine is 0.5 to 3.0.
[5] The polyol composition according to [1], wherein the tertiary amine is a compound represented by the following formula (1)

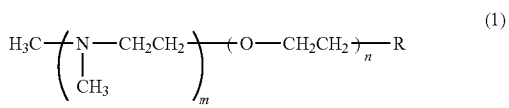

wherein m is an integer of 1 to 4, n is an integer of 0 or 1, and R represents —N(CH$_3$) (CH$_3$) or a hydroxyl group; or the tertiary amine is a compound having an imidazole structure.
[6] The polyol composition according to [1], further comprising a flame retardant.
[7] The polyol composition according to [6], wherein
  the flame retardant is a combination of red phosphorus with at least one member selected from the group consisting of phosphoric esters, phosphate-containing flame retardants, bromine-containing flame retardants, boron-containing flame retardants, antimony-containing flame retardants, and metal hydroxides;
  the content of the red phosphorus is 5.5 parts by mass to 193 parts by mass per 100 parts by mass of the polyol; and
  the total content of the flame retardant is 16 parts by mass to 260 parts by mass per 100 parts by mass of the polyol.
[8] A polyurethane premix composition comprising separately the polyol composition of any one of [1] to [7] and a polyisocyanate compound.
[9] A polyurethane composition, which is a mixture of the polyol composition of any one of [1] to [7] and a polyisocyanate compound.
[10] The polyurethane composition according to [9], which has an isocyanate index of 300 or more.
[11] A polyurethane resin obtained by curing the polyurethane composition of [9] or [10].
[12] The polyurethane resin according to [11], which is a molded article.
[13] The polyurethane resin according to [11] or [12], wherein
  the polyisocyanate compound is an aromatic polyisocyanate; and
  when the average value within the range of 1900 to 2000 cm$^{-1}$ is adjusted to zero, the maximum value within the range of 1390 to 1430 cm$^{-1}$ is 0.5 times or more the maximum value within the range of 1500 to 1520 cm$^{-1}$.

Advantageous Effects of Invention

The polyurethane composition according to the present invention has an excellent isocyanurate formation capacity and excellent fire resistance.

DESCRIPTION OF EMBODIMENTS

The present invention encompasses (i) a polyol composition for obtaining a polyurethane resin by reacting the composition with a polyisocyanate compound, comprising a transition metal compound and a tertiary amine; (ii) a polyurethane premix composition comprising separately the polyol composition and a polyisocyanate compound; (iii) a polyurethane composition, which is a mixture of the polyol composition and a polyisocyanate compound; and (iv) a polyurethane resin obtained by curing the polyurethane composition.

The polyol composition contains a polyol, a transition metal compound, and a tertiary amine, optionally with other components. Other components include, but are not limited to, a foam stabilizer, a catalyst, a foaming agent, and a flame retardant.

For example, when containing a foaming agent and a foam stabilizer, the polyol composition can be used as a polyol composition for obtaining a polyurethane foam. When combined with a polyisocyanate compound, the polyol composition can serve as a foamable polyurethane premix composition or a foamable polyurethane composition. A polyurethane foam is obtained by foaming and curing such a foamable polyurethane composition.

A polyisocyanate as the main component for a urethane resin and a polyol as a curing agent for a urethane resin undergo a chemical reaction and then cure, thereby forming a urethane resin.

The following describes each component.

1. Polyol

Examples of the polyol that serves as a curing agent for urethane resins include polylactone polyols, polycarbonate polyols, aromatic polyols, alicyclic polyols, aliphatic polyols, polyester polyols, polymer polyols, and polyether polyols.

Examples of polylactone polyols include polypropiolactone glycol, polycaprolactone glycol, and polyvalerolactone glycol.

Examples of polycarbonate polyols include polyols obtained by dealcoholization of a hydroxy-containing compound, such as ethylene glycol, propylene glycol, butanediol, pentanediol, hexanediol, octanediol, and nonanediol, with diethylene carbonate, dipropylene carbonate, or the like.

Examples of aromatic polyols include bisphenol A, bisphenol F, phenol novolac, and cresol novolac.

Examples of alicyclic polyols include cyclohexane diol, methylcyclohexane diol, isophorone diol, dicyclohexylmethane diol, and dimethyl dicyclohexylmethane diol.

Examples of aliphatic polyols include ethylene glycol, propylene glycol, butanediol, pentanediol, and hexanediol.

Examples of polyester polyols include polymers obtained by dehydration condensation of a polybasic acid and a polyhydric alcohol; polymers obtained by ring-opening polymerization of a lactone, such as ε-caprolactone and α-methyl-ε-caprolactone; and condensation products of a hydroxycarboxylic acid and a polyhydric alcohol, or the like.

Specific examples of the polybasic acid include adipic acid, azelaic acid, sebacic acid, terephthalic acid, isophthalic acid, and succinic acid. Specific examples of the polyhydric alcohol include bisphenol A, ethylene glycol, 1,2-propylene glycol, 1,4-butanediol, diethylene glycol, 1,6-hexane glycol, and neopentylglycol.

Specific examples of the hydroxycarboxylic acid include castor oil, and reaction products of castor oil and ethylene glycol.

Examples of polymer polyols include polymers obtained by graft-polymerizing an ethylenically unsaturated compound, such as acrylonitrile, styrene, methyl acrylate, and methacrylate, to aromatic polyols, alicyclic polyols, aliphatic polyols, or polyester polyols; polybutadiene polyols; modified polyols of polyhydric alcohols; and hydrogenated products thereof.

Examples of modified polyols of polyhydric alcohols include those obtained by reacting a polyhydric alcohol (a starting material) with alkylene oxide for modification.

Examples of polyhydric alcohols include trihydric alcohols, such as glycerin and trimethylol propane; tetrahydric to octahydric alcohols, such as pentaerythritol, sorbitol, mannitol, sorbitan, diglycerin, dipentaerythritol, sucrose, glucose, mannose, fructose, methyl glucoside, and derivatives thereof; phenol polybutadiene polyols, such as phenol, phloroglucin, cresol, pyrogallol, catechol, hydroquinone, bisphenol A, bisphenol F, bisphenol S, 1-hydroxy naphthalene, 1,3,6,8-tetrahydroxy naphthalene, anthrol, 1,4,5,8-tetrahydroxy anthracene, and 1-hydroxypyrene; castor oil polyols; polyfunctional polyols (e.g., the number of functional groups is 2 to 100), such as (co)polymers of hydroxy alkyl (meth)acrylate, and polyvinyl alcohols; and condensation products of phenol and formaldehyde (novolac).

Although the method for modifying a polyhydric alcohol is not particularly limited, a modification method by adding alkylene oxide (hereinafter, abbreviated as "AD") is suitably used.

Examples of AO include AO having 2 to 6 carbon atoms, such as ethylene oxide (hereinafter, abbreviated as "ED"), 1,2-propylene oxide (hereinafter, abbreviated as "PO"), 1,3-propylene oxide, 1,2-butylene oxide, and 1,4-butylene oxide.

Of these, from the standpoint of properties and reactivity, PO, ED, and 1,2-butylene oxide are preferable, with PO and EO being more preferable. When two or more AOs are used (e.g., PO and EO), the addition method may be either block addition or random addition, or a combination of these two addition methods.

Examples of polyether polyols include polymers obtained by ring-opening polymerization of at least one alkylene oxide of ethylene oxide, propylene oxide, tetrahydrofuran, and the like in the presence of at least one member of low-molecular-weight active hydrogen compounds having 2 or more active hydrogen atoms.

Examples of low-molecular-weight active hydrogen compounds having 2 or more active hydrogen atoms include diols, such as bisphenol A, ethylene glycol, propylene glycol, butylene glycol, and 1,6-hexanediol; triols, such as glycerin, and trimethylol propane; and amines, such as ethylene diamine, and butylene diamine.

The polyol for use in the present invention is preferably a polyester polyol or a polyether polyol due to their large effect in reducing the total amount of heat generation in burning.

Of these, polyester polyols having a molecular weight of 200 to 800 are more preferable, and polyester polyols having a molecular weight of 300 to 500 are still more preferable for use.

2. Transition Metal Compound

Examples of the transition metal compound include zinc, copper, iron, tin, lead, bismuth, metal oxides thereof, organic acid metal salts thereof, inorganic acid metal salts thereof, and metal complexes thereof. Examples of organic acid metal salts thereof include metal acetate, metal octylate, metal stearate, and metal carbonate. Examples of inorganic acid metal salts include metal chloride, and metal borate.

The transition metal compound is preferably a zinc compound, which contains zinc. Examples of zinc compounds include zinc, zinc oxide, zinc borate, zinc stearate, zinc acetate, zinc octylate, zinc chloride, and zinc carbonate.

An example of the amount of the transition metal compound added is preferably 0.3 parts by mass to 38 parts by mass, and more preferably 2.5 parts by mass to 12 parts by mass, per 100 parts by mass of the polyol. In the polyurethane composition, the transition metal compound is present in an amount of 0.1 parts by mass to 10 parts by mass, and preferably 0.7 parts by mass to 3 parts by mass, per 100 parts by mass of the urethane resin (the total amount of the polyol and the polyisocyanate compound).

Increasing the amount of the transition metal compound, particularly a zinc compound, accelerates the speed of curing reaction of the urethane resin, and prevents the polyurethane composition from dropping off. When the composition is foamed on-site, in which dropping of the composition can be problematic, increasing the amount of the transition metal compound is particularly useful.

The transition metal compounds may be used singly, or in a combination of two or more.

3. Tertiary Amine

Examples of the tertiary amine include the following: tertiary amines usable as a urethane catalyst, such as alkylated polyalkylene polyamine, triethyl amine, N",N"-pentamethyl diethylene triamine, N,N,N'-trimethyl aminoethyl-ethanol amine, and N,N,N',N",N"-pentamethyl diethylene triamine; and tertiary amines that are nitrogen-containing catalysts, such as imidazole compounds having an imidazole structure, including as N-methylmorpholine bis(2-dimethylamino ethyl)ether, N,N,N',bis(2-dimethylamino ethyl)ether, N-methyl,N'-dimethylamino ethyl piperazine, 1,2-dimethylimidazole, and 1-isobutyl-2 methyl-imidazole. These are simply an example, and other tertiary amines are also included.

A preferable example of the tertiary amine is a compound represented by the following formula (1):

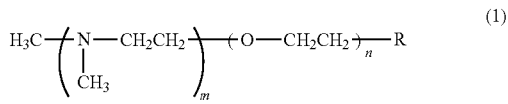

wherein m is an integer of 1 to 4; n is an integer of 0 or 1; and R represents —N(CH$_3$)(CH$_3$) or a hydroxyl group.

The compound represented by formula (1) includes N,N, N',N",N"-pentamethyl diethylene triamine in which the combination (m,n,R) is (1,0,—N(CH$_3$)(CH$_3$)). However, the compound is not limited to this compound.

The amount of the tertiary amine added is preferably 1.1 parts by mass to 30 parts by mass, more preferably 1.1 parts by mass to 23 parts by mass, still more preferably 1.1 parts by mass to 19 parts by mass, and most preferably 1.1 parts by mass to 15 parts by mass, per 100 parts by mass of the polyol. In the polyurethane composition, the tertiary amine may be present in an amount of 0.3 parts by mass to 8 parts by mass, more preferably 0.3 parts by mass to 6 parts by mass, still more preferably 0.3 parts by mass to 5 parts by mass, and most preferably 0.3 parts by mass to 4.0 parts by mass, per 100 parts by mass of the urethane resin.

When the amount of the tertiary amine is the lower limit or over, the formation of urethane bonds is not impaired. When the amount of the tertiary amine is the upper limit or below, a suitable foaming rate and curing rate can be maintained, which makes the composition easy to handle.

When the transition metal compound is a zinc compound, the weight ratio of the zinc compound to the tertiary amine is preferably 0.1 to 10, more preferably 0.5 to 8.0, still more preferably 0.5 to 5.0, and most preferably 0.5 to 3.0.

The tertiary amines may be used singly, or in a combination of two or more.

4. Polyisocyanate Compound

Examples of the polyisocyanate compound, which is the main component of a urethane resin, include aromatic polyisocyanates, alicyclic polyisocyanates, and aliphatic polyisocyanates.

Examples of aromatic polyisocyanates include phenylene diisocyanate, tolylene diisocyanate, xylylene diisocyanate, diphenyl methane diisocyanate, dimethyl diphenyl methane diisocyanate, triphenylmethane triiocyanate, naphthalene diisocyanate, and polymethylene polyphenyl polyisocyanate.

Examples of alicyclic polyisocyanates include cyclohexylene diisocyanate, methyl cyclohexylene diisocyanate, isophorone diisocyanate, dicyclohexylmethane diisocyanate, and dimethyl dicyclohexylmethane diisocyanate.

Examples of aliphatic polyisocyanates include methylene diisocyanate, ethylene diisocyanate, propylene diisocyanate, tetramethylene diisocyanate, and hexamethylene diisocyanate.

The polyisocyanate compounds may be used singly, or in a combination of two or more. The main component of a urethane resin is preferably aromatic polyisocyanates, such as diphenyl methane diisocyanate, from the standpoint of, for example, convenience and availability.

5. Foam Stabilizer

Examples of foam stabilizers include surfactants, such as polyoxyalkylene foam stabilizers (e.g., polyoxyalkylene alkyl ether) and silicone foam stabilizers (e.g., organopolysiloxane).

An example of the amount of the foam stabilizer added is preferably 0.3 parts by mass to 38 parts by mass, per 100 parts by mass of the polyol. In the polyurethane composition, the foam stabilizer is present in an amount of, for example, 0.1 parts by mass to 10 parts by mass, per 100 parts by mass of the urethane resin; however, the amount can be suitably determined, depending on the urethane resin.

The foam stabilizers may be used singly, or in a combination of two or more.

6. Catalyst

Examples of the catalyst include trimerization catalysts.

A trimerization catalyst causes the isocyanate groups present in a polyisocyanate (which is the main component of a polyurethane resin) to undergo a reaction, leads them to trimerization, and further facilitates the formation of isocyanurate rings.

To further facilitate the formation of isocyanurate rings, for example, the following may be used as a trimerization catalyst: nitrogen-containing aromatic compounds, such as tris(dimethylaminomethyl)phenol, 2,4-bis(dimethylamino methyl)phenol, and 2,4,6-tris(dialkylaminoalkyl)hexahydro-S-triazine; carboxylic acid alkali metal salts, such as potassium acetate, potassium 2-ethyl hexanoate, and potassium octylate; tertiary ammonium salts, such as trimethyl ammonium salts, triethyl ammonium salts, and triphenyl ammonium salts; and quaternary ammonium salts, such as tetramethylammonium salts, tetraethylammonium, and tetraphenylammonium salts.

In the present invention, the trimerization catalyst may not be added because sufficient flame retardancy is provided, or the trimerization catalyst may be added to further facilitate the formation of isocyanurate rings.

The amount of the trimerization catalyst, when it is added, is preferably 2.2 parts by mass to 38 parts by mass, more preferably 2.2 parts by mass to 30 parts by mass, still more preferably 2.2 parts by mass to 23 parts by mass, and most preferably 2.2 parts by mass to 12 parts by mass, per 100 parts by mass of the polyol. In the polyurethane composition, the trimerization catalyst may be present in an amount of 0.6 parts by mass to 10 parts by mass, more preferably 0.6 parts by mass to 8 parts by mass, still more preferably 0.6 parts by mass to 6 parts by mass, and most preferably 0.6 parts by mass to 3.0 parts by mass, per 100 parts by mass of the urethane resin. When the amount of the trimerization catalyst is the lower limit or over, the formation of isocyanurate rings is sufficiently facilitated. When the amount of the trimerization catalyst is the upper limit or below, a suitable foaming rate and curing rate can be maintained, which makes the composition easy to handle.

The catalysts may be used singly, or in a combination of two or more.

7. Foaming Agent

The foaming agent facilitates the formation of foam in a urethane resin. Examples of the foaming agent include water; hydrocarbons having a low boiling point, such as propane, butane, pentane, hexane, heptane, cyclopropane, cyclobutane, cyclopentane, cyclohexane, and cycloheptane; chlorinated aliphatic hydrocarbon compounds, such as dichloroethane, propyl chloride, isopropyl chloride, butyl chloride, isobutyl chloride, pentyl chloride, and isopentyl chloride; fluorine compounds, such as $CHF_3$, $CH_2F_2$, and $CH_3F$; hydrochlorofluorocarbon compounds, such as trichloromonofluoromethane, trichlorotrifluoroethane, dichloromonofluoroethane (e.g., HCFC141b (1,1-dichloro-1-fluoroethane), HCFC22 (chlorodifluoromethane), and HCFC142b (1-chloro-1,1-difluoroethane)); hydrofluorocarbons, such as HFC-245fa (1,1,1,3,3-pentafluoropropane), and HFC-365mfc (1,1,1,3,3-pentafluorobutane); hydrofluoroolefins, such as HFO-1233zd (1-chloro-3,3,3-trifluoropropene); ether compounds, such as diisopropyl ether; organic physical foaming agents, such as mixtures of these compounds; and inorganic physical foaming agents, such as nitrogen gas, oxygen gas, argon gas, and carbon dioxide gas.

The amount of the foaming agent added is not particularly limited, and is preferably 0.3 parts by mass to 2 parts by mass, more preferably 0.3 parts by mass to 67 parts by mass, still more preferably 1.8 parts by mass to 67 parts by mass, and most preferably 3.7 parts by mass to 37 parts by mass, per 100 parts by mass of the polyol. In the polyurethane composition, the foaming agent may be present in an amount of preferably 0.1 parts by mass to 30 parts by mass, more preferably 0.1 parts by mass to 18 parts by mass, still more preferably 0.5 parts by mass to 18 parts by mass, and most preferably 1 part by mass to 10 parts by mass, per 100 parts by mass of the urethane resin.

When the amount of the foaming agent is the lower limit or over, the formation of foam is facilitated, and the density of the resulting molded article can be reduced. When the amount of the foaming agent is the upper limit or below, a failure to form a foam caused by unsuccessful foaming is prevented.

The foaming agents may be used singly, or in a combination of two or more.

8. Flame Retardant

The flame retardant contains at least one member selected from red phosphorus, phosphoric esters, phosphate-containing flame retardants, bromine-containing flame retardants, boron-containing flame retardants, antimony-containing flame retardants, or metal hydroxides. Preferably, the flame retardant contains a combination of red phosphorus with at least one member selected from phosphoric esters, phosphate-containing flame retardants, bromine-containing flame retardants, boric acid-containing flame retardants, antimony-containing flame retardants, or metal hydroxides.

A suitably selected commercially available product can be used for the flame retardant.

The red phosphorus for use in the present invention is not limited, and a suitably selected commercially available product can be used.

The amount of the red phosphorus added (content) is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the polyurethane composition, the red phosphorus may be present in an amount of preferably 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

When the amount of the red phosphorus is the lower limit or over, the polyurethane composition of the present invention maintains its self-extinguishing capability. When the amount of the red phosphorus is the upper limit or below, foaming and curing of the polyurethane composition of the present invention are not impaired.

The phosphoric esters for use in the present invention are not particularly limited, and are preferably monophosphoric esters, condensed phosphoric esters, and the like.

Examples of monophosphoric esters include, although not particularly limited, trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenylphosphate, xylenyl diphenylphosphate, diphenyl (2-ethylhexyl)phosphate, di(isopropylphenyl)phenylphosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresyl phosphine oxide, diphenyl methanephosphonate, diethyl phenyl phosphonate, resorcinol bis(diphenylphosphate), bisphenol A bis(diphenylphosphate), phosphaphenanthrene, and tris($\beta$-chloropropyl)phosphate.

The condensed phosphoric esters are not particularly limited. Examples of condensed phosphoric esters include trialkyl polyphosphate, resorcinol polyphenyl phosphate, resorcinol poly(di-2,6-xylyl)phosphate (produced by Daihachi Chemical Industry Co., Ltd., trade name PX-200), hydroquinonepoly(2,6-xylyl)phosphate, and condensation products thereof.

Examples of commercially available condensed phosphoric esters include resorcinol polyphenyl phosphate (trade name: CR-733S), bisphenol A polycresyl phosphate (trade name: CR-741), aromatic condensed phosphoric ester (trade name: CR747), resorcinol polyphenyl phosphate (produced by ADEKA Corporation, trade name: ADK STAB PFR), and bisphenol A polycresyl phosphate (trade name: FP-600, and FP-700).

Of these, because of its effect in reducing the viscosity of the composition before curing and the initial heat amount, the use of a monophosphoric ester is preferable, and the use of tris(A-chloropropyl)phosphate is more preferable.

The phosphoric esters may be used singly, or in a combination of two or more.

The amount of the phosphoric ester added is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the polyurethane composition, the phosphoric ester may be present in an amount of preferably 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

When the amount of the phosphoric ester is the lower limit or over, the dense residue formed by the heat of a fire in a molded article formed from the polyurethane composition is prevented from breaking. When the amount of the phosphoric ester is the upper limit or below, foaming and curing of the polyurethane composition are not impaired.

The phosphate-containing flame retardants for use in the present invention contain phosphoric acid. The phosphoric acid used in phosphate-containing flame retardants are not particularly limited. Examples include a range of phosphoric acid, such as monophosphoric acid, pyrophosphoric acid, polyphosphoric acid, and combinations thereof.

Examples of phosphate-containing flame retardants include phosphates formed from a phosphoric acid and at least one metal or compound selected from metals that belong to group IA to IVB of the periodic table, ammonia, aliphatic amines, or aromatic amines. The metals that belong to group IA to IVB of the periodic table include lithium, sodium, calcium, barium, iron(II), iron(III), and aluminum.

The aliphatic amines include methyl amine, ethyl amine, diethyl amine, triethyl amine, ethylene diamine, and piperazine.

The aromatic amines include pyridine, triazine, melamine, and ammonium.

The phosphate-containing flame retardants may be subjected to a known waterproofness improvement treatment, such as a silane coupling agent treatment or coating treatment with melamine resin. A known foaming aid, such as melamine and pentaerythritol, may be added to the phosphate-containing flame retardants.

Specific examples of phosphate-containing flame retardants include monophosphates, pyrophosphates, and polyphosphates.

The monophosphates are not particularly limited, and examples include ammonium salts, such as ammonium phosphate, ammonium dihydrogenphosphate, and diammonium hydrogenphosphate; sodium salts, such as monosodium phosphate, disodium phosphate, trisodium phosphate, monosodium phosphite, disodium phosphite, and sodium hypophosphite; potassium salts, such as monopotassium phosphate, dipotassium phosphate, tripotassium phosphate, monopotassium phosphite, dipotassium phosphite, and potassium hypophosphite; lithium salts, such as monolithium phosphate, dilithium phosphate, trilithium phosphate, monolithium phosphite, dilithium phosphite, and lithium hypophosphite; barium salts, such as barium dihydrogen phosphate, barium hydrogen phosphate, tribarium phosphate, and barium hypophosphite; magnesium salts, such as magnesium monohydrogen phosphate, magnesium hydrogen phosphate, trimagnesium phosphate, and magnesium hypophosphite; and calcium salts, such as calcium dihydrogen phosphate, calcium hydrogen phosphate, tricalcium phosphate, and calcium hypophosphite.

The polyphosphates are not particularly limited, and examples of polyphosphates include ammonium polyphosphate, piperazine polyphosphate, melamine polyphosphate, ammonium polyphosphate amide, and aluminum polyphosphate.

Of these, because of the improvement in self-extinguishing capability of the phosphate-containing flame retardant, monophosphates are preferable for use, and ammonium dihydrogenphosphate is more preferable for use.

The phosphate-containing flame retardants may be used singly, or in a combination of two or more members.

The amount of the phosphate-containing flame retardant for use in the present invention is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the polyurethane composition, the phosphate-containing flame retardant may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

The bromine-containing flame retardants for use in the present invention are not particularly limited, as long as the retardants are compounds containing bromine in their molecular structure. Examples include aromatic brominated compounds.

Specific examples of aromatic brominated compounds include monomeric organic bromine compounds, such as hexabromobenzene, pentabromotoluene, hexabromobiphenyl, decabromobiphenyl, hexabromocyclodecane, decabromodiphenyl ether, octabromodiphenyl ether, hexabromodiphenyl ether, bis(pentabromophenoxy)ethane, ethylene-bis (tetrabromophthalimide), and tetrabromobisphenol A; brominated polycarbonates, such as polycarbonate oligomers prepared from brominated bisphenol A as a starting material, and copolymerized products of a polycarbonate oligomer and bisphenol A; brominated epoxy compounds, such as diepoxy compounds prepared by reacting brominated bisphenol A and epichlorohydrin, and monoepoxy compounds prepared by reacting a brominated phenol and epichlorohydrin; poly(brominated benzyl acrylate); brominated polyphenylene ethers; brominated bisphenol A, condensation products of cyanuric chloride and brominated phenol; brominated polystyrenes, such as brominated (polystyrene), poly(brominated styrene), and crosslinked brominated polystyrene; and halogenated bromine compound polymers, such as crosslinked or non-crosslinked brominated poly(-methylstyrene).

From the standpoint of reducing the heat amount in the initial stage of burning, brominated polystyrene, hexabromobenzene, and the like are preferable, and hexabromobenzene is more preferable.

The bromine-containing flame retardants may be used singly, or in a combination of two or more.

The amount of the bromine-containing flame retardant for use in the present invention is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the polyurethane composition, the bromine-containing flame retardant may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

The boron-containing flame retardants for use in the present invention include borax, boron oxides, boric acid, and borates.

Examples of boron oxides include diboron trioxide, boron trioxide, diboron dioxide, tetraboron trioxide, and tetraboron pentoxide.

Examples of borates include borates of alkali metals, alkaline earth metals, elements that belong to group 4, group 12, and group 13 of the periodic table, and ammonium.

Specific examples of borates include alkali metal borates, such as lithium borate, sodium borate, potassium borate, and cesium borate; alkaline-earth metal borates, such as magnesium borate, calcium borate, and barium borate; and zirconium borate, aluminum borate, and ammonium borate.

A boron-containing flame retardant for use in the present invention is preferably borate.

The boron-containing flame retardants may be used singly, or in a combination of two or more.

The amount of the boron-containing flame retardant for use in the present invention is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the polyurethane composition, the boron-containing flame retardant may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

Examples of the antimony-containing flame retardants for use in the present invention include antimony oxide, antimonate, and pyroantimonate.

Examples of antimony oxide include antimony trioxide, and antimony pentooxide.

Examples of antimonate include sodium antimonate, and potassium antimonate.

Examples of pyroantimonate include sodium pyroantimonate, and potassium pyroantimonate.

An antimony-containing flame retardant for use in the present invention is preferably antimony oxide.

The antimony-containing flame retardants may be used singly, or in a combination of two or more.

The amount of an antimony-containing flame retardant added is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the polyurethane composition, the antimony-containing flame retardant may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

Examples of the metal hydroxides for use in the present invention include magnesium hydroxide, calcium hydroxide, aluminum hydroxide, iron hydroxide, nickel hydroxide, zirconium hydroxide, titanium hydroxide, copper hydroxide, vanadium hydroxide, and tin hydroxide.

The metal hydroxides may be used singly, or in a combination of two or more.

The amount of the metal hydroxide added is preferably 5.5 parts by mass to 193 parts by mass, more preferably 5.5 parts by mass to 75 parts by mass, still more preferably 7.4 parts by mass to 56 parts by mass, and most preferably 7.4 parts by mass to 38 parts by mass, per 100 parts by mass of the polyol. In the polyurethane composition, the metal hydroxide may be present in an amount of 1.5 parts by mass to 52 parts by mass, more preferably 1.5 parts by mass to 20 parts by mass, still more preferably 2.0 parts by mass to 15 parts by mass, and most preferably 2.0 parts by mass to 10 parts by mass, per 100 parts by mass of the urethane resin.

The total amount of the flame retardants for use in the present invention is preferably 16 parts by mass to 260 parts by mass, more preferably 16 parts by mass to 149 parts by mass, and still more preferably 16 parts by mass to 2 parts by mass, per 100 parts by mass of the polyol. In the polyurethane composition, the total amount of the flame retardant may be 4.5 parts by mass to 70 parts by mass, more preferably 4.5 parts by mass to 40 parts by mass, and still more preferably 4.5 parts by mass to 30 parts by mass, per 100 parts by mass of the urethane resin.

When the total amount of the flame retardant is the lower limit or over, the dense residue formed by the heat of a fire in a molded article formed from the polyurethane composition is prevented from breaking. When the total amount of the flame retardant is the upper limit or below, foaming and curing of the polyurethane composition are not impaired.

9. Other Components

The composition according to the present invention may further contain an inorganic filler. The inorganic filler is not particularly limited, and examples include silica, diatomaceous earth, alumina, titanium oxide, calcium oxide, magnesium oxide, iron oxide, tin oxide, antimony oxide, ferrites, basic magnesium carbonate, calcium carbonate, magnesium carbonate, barium carbonate, dawsonite, hydrotalcite, calcium sulfate, barium sulfate, gypsum fiber, potassium salts, such as calcium silicate, talc, clay, mica, montmorillonite, bentonite, activated clay, sepiolite, imogolite, sericite, glass fiber, glass beads, silica balloon, aluminum nitride, boron nitride, silicon nitride, carbon black, graphite, carbon fiber, carbon balloon, charcoal powder, a range of metal powder, potassium titanate, magnesium sulfate, lead zirconate titanate, aluminum borate, molybdenum sulfide, silicon carbide, stainless fiber, a range of magnetic powder, slag fiber, fly ash, silica alumina fiber, alumina fiber, silica fiber, and zirconia fiber.

The inorganic fillers may be used singly, or in a combination of two or more.

The composition of the present invention may optionally contain an antioxidant, such as a phenol-based antioxidant, an amine-based antioxidant, and a sulfur-based antioxidant; auxiliary components, such as a heat stabilizer, a metal harm inhibitor, an antistatic agent, a stabilizer, a crosslinking agent, a lubricant, a softener, a pigment, and a tackifier resin; and a tackifier, such as polybutene and petroleum resin, as long as the object of the present invention is not impaired.

In a preferable embodiment, the composition of the present invention is formed such that the polyol, the transition metal compound, and the tertiary amine, optionally with other components, are dissolved or dispersed in an aqueous solvent composed largely of water.

When components 1 to 9 described above are mixed, the mixture undergoes a reaction and cures; i.e., the viscosity changes over time. Thus, the polyurethane composition is divided into two or more parts in order to prevent the polyurethane composition from reacting and curing (polyurethane premix composition). When the polyurethane composition is used, the divided two or more parts of the polyurethane composition is allowed to come together and are mixed, thereby preparing a polyurethane composition.

The polyurethane composition should be divided into two or more parts such that each of the divided two or more parts of the polyurethane composition does not independently begin to cure; and such that after the divided parts of the polyurethane composition are mixed, a curing reaction begins.

The polyurethane composition may be mixed at room temperature, or each of the divided parts may be preheated before being mixed.

The foam stabilizer, catalyst, foaming agent, flame retardant, etc., may be mixed with either a polyol or a polyisocyanate, or added separately from the polyol and polyisocyanate. Preferably, the polyol, foam stabilizer, catalyst, foaming agent, and flame retardant are provided as a polyol premix containing a polyol and these components (a polyol composition that is reacted with a polyisocyanate compound to prepare a polyurethane resin). The other components described in section 9 may be mixed with either a polyol or a polyisocyanate, or added separately from the polyol and polyisocyanate; the other components are preferably contained in the polyol premix.

A polyurethane composition prepared by mixing the polyol, polyisocyanate, foam stabilizer, catalyst, foaming agent, and flame retardant, or preferably a polyurethane composition prepared by mixing the polyisocyanate with a polyol premix containing the polyol, foam stabilizer, catalyst, foaming agent, and flame retardant foams and cures, thereby forming a polyurethane foam.

A feature of the composition according to the present invention is that the composition contains a transition metal compound and a tertiary amine. While not wishing to bind the present invention by any theory, it appears that the formation of a complex by a transition metal compound and a tertiary amine in the polyurethane composition develops trimerization catalyst activity and facilitates the formation of isocyanurates, thereby increasing the fire resistance. Thus, the same effect is expected to be brought about by adding a transition metal compound that is already a complex, such as ethylenediaminetetraacetic acid and a transition metal, or a porphyrin derivative and a transition metal.

The nurate formation in the present invention can be evaluated by the measurement by IR (infrared absorption analysis). In the present invention, the nurate formation is determined as present when the maximum value within the range of 1390 to 1430 cm$^{-1}$ is 0.5 times or more the maximum value within the range of 1500 to 1520 cm$^{-1}$, and the nurate formation is determined as absent when the maximum value within the range of 1390 to 1430 cm$^{-1}$ is less than 0.5 times the maximum value within the range of 1500 to 1520 cm$^{-1}$ in IR measurement performed at 5 mm to 10 mm from the surface layer of the polyurethane resin, with the average value within the range of 1900 to 2000 cm$^{-1}$ being adjusted to zero.

The maximum value of the peaks within the range of 1390 to 1430 cm$^{-1}$ indicates a nurate, and the maximum value of the peaks within the range of 1500 to 1520 cm$^{-1}$ indicates an aromatic ring.

The composition of the present invention preferably has an isocyanate index of 150 or more and 1000 or less, more preferably 200 or more and 800 or less, still more preferably 250 or more and 700 or less, and most preferably 300 or more and 600 or less.

The isocyanate index (INDEX) is calculated in accordance with the following method.

INDEX=the number of equivalents of isocyanates/
(the number of equivalents of a polyol+the
number of equivalents of water)×100

The number of equivalents of isocyanates=the number of parts of polyisocyanates used×NCO content (%)/100/the molecular weight of NCO The number of equivalents of a polyol=OHV×the number of parts of a polyol used/the molecular weight of KOH (OHV is the hydroxy value of the polyol: mg KOH/g).

The number of equivalents of water=the number of parts of water used×the number of OH groups in water/the molecular weight of water.

In the equation, the unit for the number of parts used is gram (weight), and the molecular weight of NCO groups is 42, with the NCO content indicating the ratio of NCO groups in a polyisocyanate compound by mass %. For convenience of unit conversion in the equation, the molecular weight of KOH is 56100, and the molecular weight of water is 18, with the number of OH groups in water being 2.

The use of the polyurethane composition and the polyurethane foam of the present invention is not particularly limited. They are typically used in filling openings or gaps in buildings. The term "buildings" as used herein includes any structures that are part of buildings, such as building structural materials for walls, ceilings, roofs, and floors; as well as fittings, such as windows (e.g., double sliding windows, casement windows, and double-hung windows), shoji (Japanese sliding windows or doors), tabira (i.e., doors), to (Japanese doors), fusuma (Japanese sliding doors), and transoms. The term "openings" refers to any openings found in a building, including joints between the structural materials of a building, and holes in one structural material. Among the openings, a "gap" refers to an opening found between two oppositely facing components or portions, such as those between a structural material and a structural material, between a structural material and a fitting, between a fitting and a fitting, and between a structural material or a fitting and furniture (e.g., a kitchen sink).

The polyurethane composition may directly fill an opening or gap in a building. Alternatively, the composition may also be poured into a container, such as a mold, to form it into a size that will fit an opening or gap in a building (length, width, and thickness); or may be discharged from a mixing container into another place, and the resulting polyurethane foam is cut into pieces of a predetermined size (length, width, and thickness) to fill an opening or gap in a building.

The polyisocyanurate obtained by foaming and curing the polyurethane composition is excellent in waterproofness, airtightness, and fire resistance. Thus, the polyisocyanurate can effectively prevent water, smoke, flames, gas generated by combustion, etc., from entering through openings or gaps in buildings. The polyisocyanurate thus functions as a fireproof material.

The following Examples describe the present invention in more detail. However, the present invention is not limited to these Examples.

EXAMPLES

Test Example 1

1. Production of Polyurethane Composition and Polyurethane Resin

In accordance with the formulations shown in Tables 1 and 2, polyurethane compositions of Examples 1 to 13 and Comparative Examples 1 to 5 were prepared in two separate parts: (1) a polyol premix, and (2) a polyisocyanate. The amount of each component described in Tables 1 and 2 is indicated by parts by mass. The following are the details of each component in Tables 1 and 2.

(1) Polyol Premix
  Polyol
p-phthalic acid polyester polyol (produced by Kawasaki Kasei Chemicals Ltd., trade name: Maximol RLK-087, hydroxy value: 200 mgKOH/g)
  Zinc Compound
Zinc borate (produced by Hayakawa Co., Ltd., trade name: Firebrake ZB)
Zinc acetate (produced by Wako Pure Chemical Industries, Ltd.) Zinc stearate (produced by Wako Pure Chemical Industries, Ltd.)
  Tertiary Amine
Alkylated polyalkylene polyamine (produced by Tosoh Corporation, trade name: TOYOCAT®-TT: N,N,N',N",N"-pentamethyl diethylene triamine)
An imidazole compound (produced by San-Apro Ltd., trade name: U-CAT 202)
A mixture of an imidazole compound and an ethylene glycol (produced by Tosoh Corporation, trade name: TOYOCAT®-DM70)
  Catalyst
A trimerization catalyst (produced by Tosoh Corporation, trade name: TOYOCAT®-TRX)
A trimerization catalyst (produced by San-Apro Ltd., trade name: U-CAT 18X)
(2) Polyisocyanate
4,4'-diphenyl methane diisocyanate (4,4'-MDI) (produced by Wanhua Chemical Group Co., Ltd., trade name: PM200)

In accordance with the formulations shown in Tables 1 and 2, (1) components of a polyol premix were weighed and placed in a 1000-mL polypropylene beaker, and mixed and stirred by hand at 25° C. for 1 minute.

After stirring, (2) polyisocyanate was added to (1) the kneaded product of the components of the polyol premix, and stirred with a hand-held mixer for about 10 seconds, thereby preparing a polyurethane resin composition. The obtained polyurethane resin composition lost its flowability over time, thereby giving a cured polyurethane resin.

The polyurethane resin was evaluated in accordance with the following criteria.

2. IR Measurement

The isocyanurate formation was measured with an IR analyzer (produced by Varian, FT-IR Microscope 600UMA) by the attenuated total reflection (ATR) method.

At the position of 5 mm to 10 mm from the surface layer of the polyurethane resin, the isocyanurate formation was measured by IR. Under the conditions such that the average value within the range of 1900 to 2000 $cm^{-1}$ was adjusted to zero, when the maximum value within the range of 1390 to 1430 $cm^{-1}$ was 0.5 times or more the maximum value within the range of 1500 to 1520 $cm^{-1}$, the result was rated as A; when the maximum value was less than 0.5 times, the result was rated as B. Tables 1 and 2 show the results.

3. Isocyanate Index

In the same manner as described earlier, the isocyanate index of the cured polyurethane resin was calculated. Tables 1 and 2 show the results.

TABLE 1

| | | | (Parts by Mass) | | | | |
|---|---|---|---|---|---|---|---|
| | | | Example 1 | Example 2 | Example 3 | Example 4 | Example 5 |
| Compostition | Isocyanate | PM200 | 63.8 | 73.2 | 73.2 | 73.2 | 73.2 |
| | Polyol | RLK-087 | 36.2 | 26.7 | 26.7 | 26.7 | 26.7 |
| | Trimerization Catalyst | TOYOCAT-TRX | 1.4 | 1.4 | 1.4 | 1.4 | |
| | | U-CAT 18X | 1.0 | 1.0 | 1.0 | 1.0 | |
| | Tertiary Amine | TOYOCAT-TT | 1.0 | 1.0 | 1.0 | 1.0 | |
| | | U-CAT 202 | | | | 2.4 | |
| | | TOYOCAT-DM70 | 2.4 | 2.4 | 2.4 | | 3.4 |
| | Zinc Compound | FIRE BREAK ZB (Zinc Borate) | 3.0 | | | 3.0 | 3.0 |
| | | Zinc Acetate | | 3.0 | | | |
| | | Zinc Stearate | | | 3.0 | | |
| Evaluation | Nurate Formation | | A | A | A | A | A |
| | Index | | 368 | 572 | 572 | 572 | 572 |

| | | | (Parts by Mass) | | | |
|---|---|---|---|---|---|---|
| | | | Example 6 | Example 7 | Example 8 | Example 9 |
| Compostition | Isocyanate | PM200 | 73.2 | 73.2 | 73.2 | 73.2 |
| | Polyol | RLK-087 | 26.7 | 26.7 | 26.7 | 26.7 |
| | Trimerization Catalyst | TOYOCAT-TRX | | | | |
| | | U-CAT 18X | | | | |
| | Tertiary Amine | TOYOCAT-TT | | | | |
| | | U-CAT 202 | | | | |
| | | TOYOCAT-DM70 | 3.4 | 3.4 | 3.4 | 3.4 |
| | Zinc Compound | FIRE BREAK ZB (Zinc Borate) | | | | |
| | | Zinc Acetate | 3.0 | 1.7 | 0.7 | 6.8 |
| | | Zinc Stearate | | | | |
| Evaluation | Nurate Formation | | A | A | A | A |
| | Index | | 572 | 572 | 572 | 572 |

TABLE 2

| | | | Example 9 | Example 10 | Example 11 | Example 12 | Example 13 | Comparative Example 1 |
|---|---|---|---|---|---|---|---|---|
| Composition | Isocyanate | PM200 | 73.2 | 73.2 | 73.2 | 73.2 | 73.2 | 73.2 |
| | Polyol | RLK-087 | 26.7 | 26.7 | 26.7 | 26.7 | 26.7 | 26.7 |
| | Trimerization Catalyst | TOYOCAT-TRX | | | | | | 1.4 |
| | | U-CAT 18X | | | | | | 1.0 |
| | Tertiary Amine | TOYOCAT-TT | | | | 3.4 | | 1.0 |
| | | U-CAT 202 | | | | | 3.4 | 2.4 |
| | | TOYOCAT-DM70 | 3.4 | 3.4 | 3.4 | | | |
| | Zinc Compound | FIRE BREAK ZB (Zinc Borate) | | | | | | |
| | | Zinc Acetate | 6.8 | | | 3.0 | 3.0 | |
| | | Zinc Stearate | | 10.2 | 3.0 | | | |
| Evaluation | Nurate Formation | | A | A | A | A | A | B |
| | Index | | 572 | 572 | 572 | 572 | 572 | 572 |

| | | | Comparative Example 2 | Comparative Example 3 | Comparative Example 4 | Comparative Example 5 |
|---|---|---|---|---|---|---|
| Composition | Isocyanate | PM200 | 73.2 | 73.2 | 73.2 | 73.2 |
| | Polyol | RLK-087 | 26.7 | 26.7 | 26.7 | 26.7 |
| | Trimerization Catalyst | TOYOCAT-TRX | 1.4 | | | |
| | | U-CAT 18X | 1.0 | | | |
| | Tertiary Amine | TOYOCAT-TT | | | | |
| | | U-CAT 202 | | | | |
| | | TOYOCAT-DM70 | | | 3.4 | 3.4 |
| | Zinc Compound | FIRE BREAK ZB (Zinc Borate) | | | | |
| | | Zinc Acetate | 6.4 | | | 3.0 |
| | | Zinc Stearate | | | | |
| Evaluation | Nurate Formation | | B | B | B | B |
| | Index | | 572 | 572 | 572 | 572 |

Test Example 2

In the same manner as in Test Example 1, polyurethane compositions of Examples 14 and 15 were prepared in accordance with the formulations shown in Table 3, and then polyurethane resins (foam) were prepared.

The foaming agent, flame retardant, and foam stabilizer stated in Table 3 are as follows.

Foaming Agent

Water

HFC: HFC-365mfc (1,1,1,3,3-pentafluorobutane, produced by Central Glass Co., Ltd.) and HFC-245fa (1,1,1,3,3-pentafluoropropane, Nippon Solvay K.K.), the mixture ratio HFC-365mfc:HFC-245fa=7:3, "HFC")

Flame Retardant

Tris(β-chloropropyl)phosphate (produced by Daihachi Chemical Industry Co., Ltd., trade name: TMCPP, "TMCPP")

Red phosphorus (produced by Rin Kagaku Kogyo Co., Ltd., trade name: Nova Excel 140)

Inorganic Filler

Wollastonite ($SiO_2 \cdot CaO$) (produced by Kinsei Matec Co., Ltd., trade name: SH-1250)

Foam Stabilizer

Polyalkyleneglycol-based foam stabilizer (produced by Dow Corning Toray Co., Ltd., trade name: SH-193)

The isocyanurate formation of the resins was evaluated in accordance with the criteria in Test Example 1 by IR measurement. The isocyanate index was also calculated as in Test Example 1. Table 3 shows the results.

TABLE 3

| | | | Example 14 | Example 15 |
|---|---|---|---|---|
| Composition | Isocyanate | PM200 | 73.2 | 73.2 |
| | Polyol | RLK-087 | 26.7 | 26.7 |
| | Trimerization Catalyst | TOYOCAT-TRX | 1.4 | 1.4 |
| | | U-CAT 18X | 1.0 | 1.0 |
| | Tertiary Amine | TOYOCAT-TT | 1.0 | 1.0 |
| | | U-CAT 202 | 0.9 | 0.9 |
| | | TOYOCAT-DM70 | 1.5 | 1.5 |
| | Foam Stabilizer | SH-193 | 1.7 | 1.7 |
| | Foaming Agent | Water | 0.2 | 0.2 |
| | | HFC | 15.0 | 15.0 |
| | Flame Retardant | TMCPP | | 12.0 |
| | | Nova Excel 140 | | 8.0 |
| | Inorganic Filler | SH-1250 | | 3.5 |
| | Zinc Compound | FIRE BREAK ZB (Zinc Borate) | 3.0 | 3.0 |
| | | Zinc Acetate | | |
| | | Zinc Stearate | | |
| Evaluation | Nurate Formation | | A | A |
| | Index | | 464 | 464 |

The invention claimed is:

1. A polyol composition for obtaining a polyurethane resin foam by reacting the composition with a polyisocyanate compound, the polyol composition comprising
a polyol,
a foaming agent comprising a hydrofluoroolefin,
a transition metal compound comprising zinc, and
a tertiary amine having an imidazole structure.

2. The polyol composition according to claim 1, wherein the weight ratio of the zinc compound to the tertiary amine is 0.5 to 3.0.

3. The polyol composition according to claim 1, further comprising a flame retardant.

4. The polyol composition according to claim 3, wherein
the flame retardant is a combination of red phosphorus with at least one member selected from the group consisting of a phosphoric ester, a phosphate-containing flame retardant, a bromine-containing flame retardant, a boron-containing flame retardant, an antimony-containing flame retardant, and a metal hydroxide;
the content of the red phosphorus is 5.5 parts by mass to 193 parts by mass per 100 parts by mass of the polyol; and
the total content of the flame retardant is 16 parts by mass to 260 parts by mass per 100 parts by mass of the polyol.

5. A foamed polyurethane premix composition comprising separately the polyol composition of claim 1 and a polyisocyanate compound.

6. A foamed polyurethane composition, which is a mixture of the polyol composition of claim 1 and a polyisocyanate compound.

7. The foamed polyurethane composition according to claim 6, which has an isocyanate index of 300 or more.

8. A polyurethane foam obtained by curing the foamed polyurethane composition of claim 6.

9. The polyurethane foam according to claim 8, which is a molded article.

10. The polyurethane foam according to claim 8, wherein
the polyisocyanate compound is an aromatic polyisocyanate; and
in an infrared absorption analysis, when an average value within the range of 1900 to 2000 $cm^{-1}$ is adjusted to zero, a maximum value within the range of 1390 to 1430 $cm^{-1}$ is 0.5 times or more a maximum value within the range of 1500 to 1520 $cm^{-1}$.

11. A polyurethane foam obtained by curing the foamed polyurethane composition of claim 7.

* * * * *